United States Patent
Schwarz

(10) Patent No.: US 11,585,268 B2
(45) Date of Patent: *Feb. 21, 2023

(54) GEARED TURBOFAN ENGINE WITH TARGETED MODULAR EFFICIENCY

(71) Applicant: Raytheon Technologies Corporation, Farmington, CT (US)

(72) Inventor: Frederick M. Schwarz, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/737,179

(22) Filed: May 5, 2022

(65) Prior Publication Data

US 2022/0268203 A1 Aug. 25, 2022

Related U.S. Application Data

(63) Continuation of application No. 17/038,608, filed on Sep. 30, 2020, now Pat. No. 11,371,427, which is a continuation of application No. 16/531,704, filed on Aug. 5, 2019, now Pat. No. 10,823,052, which is a continuation of application No. 14/651,923, filed as application No. PCT/US2014/057127 on Sep. 24, 2014, now Pat. No. 10,371,047.

(60) Provisional application No. 61/891,475, filed on Oct. 16, 2013.

(51) Int. Cl.
*F02C 3/107* (2006.01)
*F01D 5/14* (2006.01)
*F02K 3/06* (2006.01)

(52) U.S. Cl.
CPC .............. *F02C 3/107* (2013.01); *F01D 5/142* (2013.01); *F02K 3/06* (2013.01); *F05D 2220/327* (2013.01); *F05D 2220/36* (2013.01); *F05D 2260/40311* (2013.01); *Y02T 50/60* (2013.01)

(58) Field of Classification Search
CPC .......... F01D 5/142; F02C 3/107; Y02T 50/673
See application file for complete search history.

(56) References Cited

U.S. PATENT DOCUMENTS 2,258,792 A 10/1941 New
2,936,655 A 5/1960 Peterson et al.
(Continued)

FOREIGN PATENT DOCUMENTS

EP 0791383 A1 8/1997
EP 1142850 A1 10/2001
(Continued)

OTHER PUBLICATIONS

2003 NASA seal/secondary air system workshop. (2003). NASA/CP-2004-212963/vol. 1. Sep. 1, 2004. pp. 1-408.
(Continued)

*Primary Examiner* — Mary Davis
(74) *Attorney, Agent, or Firm* — Carlson, Gaskey & Olds, P.C.

(57) ABSTRACT

A turbine engine includes a first compression section includes a last blade trailing edge radial tip length that is greater than about 67% of the radial tip length of a leading edge of a first stage of the first compression section. A second compression section includes a last blade trailing edge radial tip length that is greater than about 57% of a radial tip length of a leading edge of a first stage of the first compression section.

20 Claims, 1 Drawing Sheet

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,363,419 A | 1/1968 | Light et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Don et al. |
| 3,820,719 A | 6/1974 | Clark et al. |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,118,927 A | 10/1978 | Kronogard |
| 4,130,872 A | 12/1978 | Haloff |
| 4,220,171 A | 9/1980 | Ruehr et al. |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,649,114 A | 3/1987 | Miltenburger et al. |
| 4,696,156 A | 9/1987 | Burr et al. |
| 4,722,357 A | 2/1988 | Wynosky |
| 4,860,537 A | 8/1989 | Taylor |
| 4,966,338 A | 10/1990 | Gordon |
| 4,979,362 A | 12/1990 | Vershure, Jr. |
| 5,058,617 A | 10/1991 | Stockman et al. |
| 5,102,379 A | 4/1992 | Pagluica et al. |
| 5,136,839 A | 8/1992 | Armstrong |
| 5,141,400 A | 8/1992 | Murphy et al. |
| 5,174,525 A | 12/1992 | Schilling |
| 5,273,393 A | 12/1993 | Jones et al. |
| 5,275,357 A | 1/1994 | Seelen et al. |
| 5,277,382 A | 1/1994 | Seelen et al. |
| 5,317,877 A | 6/1994 | Stuart |
| 5,320,307 A | 6/1994 | Spofford et al. |
| 5,361,580 A | 11/1994 | Ciokajlo et al. |
| 5,372,338 A | 12/1994 | Carlin et al. |
| 5,409,184 A | 4/1995 | Udall et al. |
| 5,433,674 A | 7/1995 | Sheridan et al. |
| 5,443,229 A | 8/1995 | O'Brien et al. |
| 5,447,411 A | 9/1995 | Curley et al. |
| 5,452,575 A | 9/1995 | Freid |
| 5,466,198 A | 11/1995 | McKibbin et al. |
| 5,474,258 A | 12/1995 | Taylor et al. |
| 5,497,961 A | 3/1996 | Newton |
| 5,524,847 A | 6/1996 | Brodell et al. |
| 5,634,767 A | 6/1997 | Dawson |
| 5,677,060 A | 10/1997 | Terentieva et al. |
| 5,694,765 A | 12/1997 | Hield et al. |
| 5,746,391 A | 5/1998 | Rodgers et al. |
| 5,778,659 A | 7/1998 | Duesler et al. |
| 5,810,287 A | 9/1998 | O'Boyle et al. |
| 5,857,836 A | 1/1999 | Stickler et al. |
| 5,860,276 A | 1/1999 | Newton |
| 5,871,175 A | 2/1999 | Demouzon et al. |
| 5,871,176 A | 2/1999 | Demouzon et al. |
| 5,871,177 A | 2/1999 | Demouzon et al. |
| 5,915,917 A | 6/1999 | Eveker et al. |
| 5,921,500 A | 7/1999 | Ellis et al. |
| 5,927,644 A | 7/1999 | Ellis et al. |
| 5,975,841 A | 11/1999 | Lindemuth et al. |
| 5,985,470 A | 11/1999 | Spitsberg et al. |
| 6,126,110 A | 10/2000 | Seaquist et al. |
| 6,138,949 A | 10/2000 | Manende et al. |
| 6,189,830 B1 | 2/2001 | Schnelz et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,474,597 B1 | 11/2002 | Cazenave |
| 6,517,027 B1 | 2/2003 | Abruzzese |
| 6,517,341 B1 | 2/2003 | Brun et al. |
| 6,607,165 B1 | 8/2003 | Manteiga et al. |
| 6,652,222 B1 | 11/2003 | Wojtyczka et al. |
| 6,708,925 B2 | 3/2004 | Udall |
| 6,709,492 B1 | 3/2004 | Spadaccini et al. |
| 6,814,541 B2 | 11/2004 | Evans et al. |
| 6,843,449 B1 | 1/2005 | Manteiga et al. |
| 6,883,303 B1 | 4/2005 | Seda |
| 6,899,518 B2 | 5/2005 | Lucas et al. |
| 6,935,591 B2 | 8/2005 | Udall |
| 6,976,655 B2 | 12/2005 | Thompson |
| 7,021,042 B2 | 4/2006 | Law |
| 7,021,585 B2 | 4/2006 | Loewenstein et al. |
| 7,055,330 B2 | 6/2006 | Miller |
| 7,134,286 B2 | 11/2006 | Markarian et al. |
| 7,219,490 B2 | 5/2007 | Dev |
| 7,328,580 B2 | 2/2008 | Lee et al. |
| 7,374,403 B2 | 5/2008 | Decker et al. |
| 7,500,365 B2 | 3/2009 | Suciu et al. |
| 7,527,220 B2 | 5/2009 | Dron |
| 7,591,754 B2 | 9/2009 | Duong et al. |
| 7,632,064 B2 | 12/2009 | Somanath et al. |
| 7,662,059 B2 | 2/2010 | McCune |
| 7,806,651 B2 | 10/2010 | Kennepohl et al. |
| 7,824,305 B2 | 11/2010 | Duong et al. |
| 7,828,682 B2 | 11/2010 | Smook |
| 7,882,691 B2 | 2/2011 | Lemmers, Jr. et al. |
| 7,926,260 B2 | 4/2011 | Sheridan et al. |
| 7,942,079 B2 | 5/2011 | Russ |
| 7,942,580 B2 | 5/2011 | Audart-Noel et al. |
| 7,997,868 B1 | 8/2011 | Liang |
| 8,205,432 B2 | 6/2012 | Sheridan |
| 8,220,245 B1 | 7/2012 | Papandreas |
| 10,371,047 B2 | 8/2019 | Schwarz |
| 10,823,052 B2 | 11/2020 | Schwarz |
| 11,371,427 B2* | 6/2022 | Schwarz ............... F02C 3/107 |
| 2003/0163983 A1 | 9/2003 | Seda et al. |
| 2006/0090448 A1 | 5/2006 | Henry |
| 2006/0228206 A1 | 10/2006 | Decker et al. |
| 2006/0248900 A1 | 11/2006 | Suciu et al. |
| 2008/0003096 A1 | 1/2008 | Kohli et al. |
| 2008/0116009 A1 | 5/2008 | Sheridan et al. |
| 2008/0317588 A1 | 12/2008 | Grabowski et al. |
| 2009/0007569 A1 | 1/2009 | Lemmers, Jr. et al. |
| 2009/0053058 A1 | 2/2009 | Kohlenberg et al. |
| 2009/0056343 A1 | 3/2009 | Suciu et al. |
| 2009/0245997 A1 | 10/2009 | Hurwitz et al. |
| 2009/0304518 A1 | 12/2009 | Kodama et al. |
| 2009/0314881 A1 | 12/2009 | Suciu et al. |
| 2010/0003121 A1 | 1/2010 | Berryann et al. |
| 2010/0105516 A1 | 4/2010 | Sheridan et al. |
| 2010/0147997 A1 | 6/2010 | Martinou et al. |
| 2010/0148396 A1 | 6/2010 | Xie et al. |
| 2010/0170980 A1 | 7/2010 | Haramburu et al. |
| 2010/0181419 A1 | 7/2010 | Haramburu et al. |
| 2010/0212281 A1 | 8/2010 | Sheridan |
| 2010/0218483 A1 | 9/2010 | Smith |
| 2010/0331139 A1 | 12/2010 | McCune |
| 2011/0114786 A1 | 5/2011 | Guillet et al. |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2012/0291449 A1 | 11/2012 | Adams et al. |
| 2013/0192198 A1 | 8/2013 | Brilliant et al. |
| 2013/0192258 A1 | 8/2013 | Kupratis et al. |

FOREIGN PATENT DOCUMENTS

| | | |
|---|---|---|
| GB | 1516041 A | 6/1978 |
| GB | 2041090 A | 9/1980 |
| GB | 2426792 A | 12/2006 |
| WO | 2007038674 A1 | 4/2007 |

OTHER PUBLICATIONS (2012). Gas Power Cycle—Jet Propulsion Technology, A case study Machine Design Magazine. Nov. 5, 1998. Retrieved from: http://machinedesign.com/content/pw8000-0820.

(56) References Cited

OTHER PUBLICATIONS

About GasTurb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Agma Standard (1997). Design and selection of components for enclosed gear drives, lexandria, VA: American Gear Manufacturers Association, pp. 1-48.
Agma Standard (1999). Flexible couplings—Mass elastic properties and other characteristics. Alexandria, VA American Gear Manufacturers Association, pp. 1-46.
Agma Standard (2006). Design manual for enclosed epicyclic gear drives. Alexandria, VA: American Gear Manufacturers Association, pp. 1-104.
Ahmad, F. and Mizramoghadam, A.V. (1999). Single v. two stage high pressure turbine design of modem aero engines. ASME. Prestend at the International Gast Turbine & Aeroengine Congress & Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Avco Lycoming Divison. ALF 502L Maintenance Manual. Apr. 1981. pp. 1-118.
Aviadvigatel D-110. Jane's Aero-engines, Aero-engines—Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Bloomer, H.E. and Loeffler, L.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982 pp 1-28.
Bloomer, H.E. and Samanich, N.E. (1982). QCSEE under-the-wing enging-wing-flap aerodynamic profile characteristics NASA-TM-82890 Sep. 1, 1982. pp. 1-48.
Bloomer, H.E., Loeffler, L.J., Kreim, W.J., and Coats, J.W. (1981). Comparison of NASA and contractor resits from aeroacoustic tests of QCSEE OTW engine. NASA Technical Memorandum 81761. Apr. 1, 1981. pp. 1-30.
Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B & K Engineering, Inc. Jun. 1979. pp. 1-348.

Brines, G.L. (1990). The turbofan of tomorrow. Mechanical Engineering: The Journal of the American Society of Mechanical Engineers, 108(8), 65-67.
Bucknell, R.L. (1973). Influence of fuels and lubricants on turbine engine design and performance, fuel and ubircant analyses. Final Technical Report, Mar. 1971-Mar. 1973 pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference, pp. 1-10.
Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.
Daggett, D.L., Brown, S.T., and Kawai, R.T. (2003). Ultra-efficient engine diameter study. NASA/DR-2003-212309. May 2003. pp. 1-52.
Dalton, III, W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-712.
Daly, M. Ed. (2010). Jane's Aero-Engine. Issue Twenty-seven. Mar. 2010. p. 633-636.
Damerau, J. (2014) What is the mesh stiffness of gears? Screen shot of query submitted by Vahid Dabbagh, answered by Dr. Jochan Damerau, Research General Managerat Bosch Corp., Japan. Retrieved from: https://www.researchgate.net/post/What_is_the_mesh_sliffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B For the Airbus A320ceo family and CFM56-7B for the Boeing 737 family. https://www.cfmaeroengines.com/.
Datasheet. Genx ™ high bypass turbofan engines. Retreived from: https://www.geaviation.com/sites/default/files/Jatasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades, pp. 1-18.
Davis, D.G.M. (1973). Variable-pitch fans: Progress in Britain. Flight International. Apr. 19, 1973. pp. 615-617.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.

(56) References Cited

OTHER PUBLICATIONS

QCSEE the aerodynamic and preliminary mechanical design of the QCSEE OTW fan. (1975). NASA-CR-134841. Feb. 1, 1975. pp. 1-74.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

QCSEE under-the-wing engine composite fan blade preliminary design test report. (1975). NASA-CR-134846. Sep. 1, 1975. pp. 1-56.

QCSEE under-the-wing engine digital control system design report. (1978). NASA-CR-134920. Jan. 1, 1978. pp. 1-309.

Quiet clean general aviation turbofan (QCGAT) technology study final report vol. I. (1975). NASA-CR-164222. Dec. 1, 1975. pp. 1-186.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Rauch, D. (1972). Design study of an air pump and integral lift engine ALF-504 using the Lycoming 502 core. Prepare for NASA. Jul. 1972. pp. 1-182.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Riegler, C., and Bichlmaier, C. (2007). The geared turbofan technology—Opportunities, challenges and readiness status. Porceedings CEAS. Sep. 10-13, 2007. Berlin, Germany, pp. 1-12.

Rolls-Royce M45H. Jane's Aero-engines, Aero-engines—Turbofan. Feb. 24, 2010.

Rotordynamic instability problems in high-performance turbomachinery. (1986). NASA conference publication 2443. Jun. 2-4, 1986.

Roux, E. (2007). Turbofan and turbojet engines database handbook. Editions Elodie Roux. Blagnac: France, pp. 1-595.

Salemme, C.T. and Murphy, G.C. (1979). Metal spar/superhybrid shell composite fan blades. Prepared for NASA. NASA-CR-159594. Aug. 1979. pp. 1-127.

Sargisson, D.F. (1985). Advanced propfan engine technology (APET) and single-rotation gearbox/pitch change mechanism. NASA Contractor Report—168113. R83AEB592 Jun. 1, 1985. pp 1-476.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

Seader, J.D. and Henley, E.J. (1998). Separation process principles. New York, NY: John Wiley & Sons, Inc. pp. 722-726 and 764-771.

Shah, D.M. (1992). MoSi2 and other silicides as high temperature structural materials. Superalloys 1992. The Minerals, Metals, & Materials Society, pp. 409-422.

Shorter Oxford English Dictionary, 6th Edition. (2007), vol. 2, N-Z, pp. 1888.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Singh, A. (2005). Application of a system level model to study the planetary load sharing behavior. Jounal of Mechanical Design. vol. 127. May 2005. pp. 469-476.

Singh, B. (1986). Small engine component technology (SECT) study. NASA CR-175079. Mar. 1, 1986. pp. 1-102.

Singh, R. and Houser, D.R. (1990). Non-linear dynamic analysis of geared systems. NASA-CR-180495. Feb. 1, 1990. pp 1-263.

Smith, C.E., Hirschkron, R., and Warren, R.E. (1981). Propulsion system study for small transport aircraft technology (STAT). Final report. NASA-CR-165330. May 1, 1981. pp. 1-216.

Smith-Boyd, L. and Pike, J. (1986). Expansion of epicyclic gear dynamic analysis program. Prepared for NASA. NASA CR-179563 Aug. 1986. pp. 1-98.

Sowers, H.D. and Coward, W.E. (1978). QCSEE over-the-wing (OTW) engine acuostic design. NASA-DR-135268. Jun. 1, 1978 pp. 1-52.

Spadaccini, L.J., and Huang, H. (2002). On-line fuel deoxygenation for coke suppression. ASME, Jun. 2002. pp. 1-7.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Sundaram, S.K., Hsu, J-Y., Speyer, R.F. (1995). Molten glass corrosion resistance of immersed combustion-heating tube materials in e-glass. J Am. Ceram. Soc. 78(7). pp. 1940-1946.

Sutliff, D. (2005). Rotating rake turbofan duct mode measurement system. NASA TM-2005-213828. Oct. 1, 2005. pp. 1-34.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Sweetman, B. and Sutton, O. (1998). Pratt & Whitney's surprise leap. Interavia Business & Technology, 53.621, p. 25.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds Ind. Eng. Chem., Prod. Res. Dev., vol. 17(1). 1978. pp. 86-90.

Technical Data. Teflon. WS Hampshire Inc. Retrieved from: http://catalog.wshampshire.com/Asset/psg_teflon_ptfe.pdf.

Technical Report. (1975). Quiet Clean Short-haul Experimental Engine (QCSEE) UTW fan preliminary design. NASA-CR-134842. Feb. 1, 1975. pp. 1-98.

Technical Report. (1977). Quiet Clean Short-haul Experimental Engine (QCSEE) Under-the-Wing (UTW) final design report. NASA-CR-134847. Jun. 1, 1977. pp. 1-697.

Thulin, R.D., Howe, D.C., and Singer, Ld. (1982). Energy efficient engine: High pressure turbine detailed design report. Prepared for NASA. NASA CR-165608. Recevied Aug. 9, 1984. pp. 1-178.

Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites 4th Int'l Conf. on High Temp. Ceramic Matrix Composites. Oct. 1-3, 2001. pp. 149-156.

Tummers, B. (2006). DataThief III. Retreived from: https://datathief.org/DatathiefManual.pdf pp. 1-52.

Turbomeca Aubisque. Jane's Aero-engines, Aero-engines—Turbofan. Nov. 2, 2009.

Declaration of John Eaton, Ph.D. In re U.S. Pat. No. 8,869,568, Executed Mar. 28, 2016, pp. 1-87.

Declaration of Reza Abhari, In re U.S. Pat. No. 8,448,895, Executed Nov. 28, 2016, pp. 1-81.

(56) References Cited

OTHER PUBLICATIONS

Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Dickey, T.A. and Dobak, E.R. (1972). The evolution and development status of ALF 502 turbofan engine. National Aerospace Engineering and Manufacturing Meeting San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press, pp. 215-219 and 355-360.
European Search Report for Application No. EP14870182.4 dated May 26, 2017, 8 pages.
Faghri, A. (1995). Heat pipe and science technology. Washington, D.C.: Taylor & Francis, pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The IFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems Ind. Eng. Chem., Prod. Res Dev., vol. 19(1). 1978. pp. 65-70.
Garret TFE731 Turbofan Engine (Cat C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and MARTINF7, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modem Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited, pp. 510-512.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., et al., "Analysis of turbofan design options for an advanced single-aisle transport aircraft", American Institute of Aeronautics and Astronautics, 2009, pp. 1-13.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor & Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company, pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp 1-13.

(56) References Cited

OTHER PUBLICATIONS

Turner, M. G., Norris, A., and Veres, J.P. (2004). High-fidelity three-dimensional simulation of the GE90. NASA/TM-2004-212981. pp. 1-18.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
U.S. Appl. No. 11/832,107 dated Aug. 1, 2007, Engine Mounting Configuration Fora Turbofan Gas Turbine Engine, 14 pages.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . VOGFI , W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400 30th Aerospace Sciences Meeting & Exhibit Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Hess, C. (1998). Pratt & Whitney develops geared turbofan. Flug Revue 43(7). Oct. 1998.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Honeywell LF507. Jane's Aero-engines, Aero-engines—Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines—Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA CR-134868 Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C, and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit NASA Ames Research Center. Sep. 8-9, 2010. pp. 1-8.
International Preliminary Report on Patentability for International Application No. PCT/US2014/057127, dated Apr. 28, 2016, 5 pages.
International Search Report and Written Opinion for PCT Application No. PCT/US2012/072271 dated Mar. 8, 2013, 9 pages.
International Search Report and Written Opinion for PCT Application No. PCT/US2014/057127, dated Jun. 10, 2015, 6 pages.
Ivchenko-Progress AI-727M. Jane's Aero-engines, Aero-engines—Turbofan. Nov. 27, 2011.
Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76(1). pp. 3-28.
Jeng, Y.-L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.

(56) References Cited

OTHER PUBLICATIONS

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week & Space Technology, 148(8). p. 34-5.
Kandebo, S.W. (1998). Geared-Turbofan engine design targets cost, complexity. Aviation Week & Space Technology, 148(8). p. 34-35.
Kandebo, S.W. (1998). Pratt & Whitney launches geared turbofan engine. Aviation Week & Space Technology, 148 (8). p. 32-34.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press, p. 11.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and KAMIGAITO, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press, p. 465.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2012). GasTurb 12: Design and off-design performance of gas turbines. Retrieved from: https://www.scribd.com/document/153900429/GasTurb-12.
Kurzke, J. (2008). Preliminary Design, Aero-engine design: From state of the art turbofans towards innovative architectures, pp. 1-72.
Kurzke, J. (2009). Fundamental differences between conventional and geared turbofans. Proceedings of ASME Turbo Expo: Power for Land, Sea, and Air. 2009, Orlando, Florida, pp. 145-153.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series Springer, pp. 1-10, 48-51.
Leckie F.A., et al., "Strength and Stiffness of Engineering Systems," Mechanical Engineering Series, Springer, 2009, pp. 1-3.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-663.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-403.
Lord, W.K., MacMartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
MacIsaac, B. and Langston, R. (2011). Gas turbine propulsion systems. Chichester, West Sussex: John Wiley & Sons, Ltd. pp. 260-265.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Manual. Student's Guide to Learning SolidWorks Software. Dassault Systemes—SolidWorks Corporation, pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 368-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 373-675, 682-685, 697-699, 703-705, 802-805, 862-864, and 923-925.
Mattingly, J.D. (1996). Elements of gas turbine propulsion. New York, New York: McGraw-Hill, Inc. pp. 8-15.
Mavris, D.N., Schutte, U.S. (2016). Application of deterministic and probabilistic system design methods and enhancements of conceptual design tools for ERA project final report. NASA/CR-2016-219201. May 1, 2016. pp. 1-240.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
McCracken, R.C. (1979). Quiet short-haul research aircraft familiarization document. NASA-TM-81149. Nov. 1, 1979. pp 1-76.
McCune, M.E. (1993). Initial test results of 40,000 horsepower fan drive gear system for advanced ducted propulsion systems. AIAA 29th Joint Conference and Exhibit Jun. 28-30, 1993. pp. 1-10.
McMillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.
Meier N. (2005) Civil Turbojet/Turbofan Specifications. Retrieved from http://jet-engine.net/civtfspec.html.
Merriam-Webster's collegiate dictionary, 10th Ed. (2001). p. 1125-1126.
Merriam-Webster's collegiate dictionary, 11th Ed. (2009). p. 824.
Meyer, A.G. (1988). Transmission development of TEXTRON Lycoming's geared fan engine. Technical Paper. Oct. 1988. pp. 1-12.
Middleton, P. (1971). 614: VFW's jet feederliner. Flight International, Nov. 4, 1971. p. 725, 729-732.

(56) References Cited

OTHER PUBLICATIONS

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed tor low energy consumption NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

Oates, G.C. (Ed). (1989). Aircraft propulsion systems and technology and design. Washington, D.C.: American Institute of Aeronautics, Inc. pp. 341-344.

Parametric study of STOL short-haul transport engine cycles and operational techniques to minimize community noise mpact. NASA-CR-114759. Jun. 1, 1974. pp. 1-398.

Parker, R.G. and Lin, J. (2001). Modeling, modal properties, and mesh stiffness variation instabilities of planetary gears. Prepared for NASA. NASA/CR-2001-210939. May 2001. pp. 1-111.

Petrovic, J.J., Castro, R.G., Vaidya, R.U., Peters, M.L, Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

Pyrograf-III Carbon Nanofiber. Product guide. Retrieved Dec. 1, 2015 from: http://pyrografproducts.com/Merchant5/merchant.mvc?Screen=cp_nanofiber.

QCSEE ball spline pitch-change mechanism whirligig test report. (1978). NASA-CR-135354. Sep. 1, 1978. pp. 1-57.

QCSEE hamilton standard cam/harmonic drive variable pitch fan actuation system derail design report. (1976). NASA-CR-134852. Mar. 1, 1976. pp. 1-172.

QCSEE main reduction gears bearing development program final report. (1975). NASA-CR-134890. Dec. 1, 1975. pp. 1-41.

QCSEE over-the-wing final design report. (1977). NASA-CR-134848. Jun. 1, 1977. pp. 1-460.

QCSEE over-the-wing propulsion system test report vol. III—mechanical performance. (1978). NASA-CR-135325. Feb. 1, 1978. pp. 1-112.

QCSEE Preliminary analyses and design report. vol. 1. (1974). NASA-CR-134838. Oct. 1, 1974. pp. 1-337.

\* cited by examiner

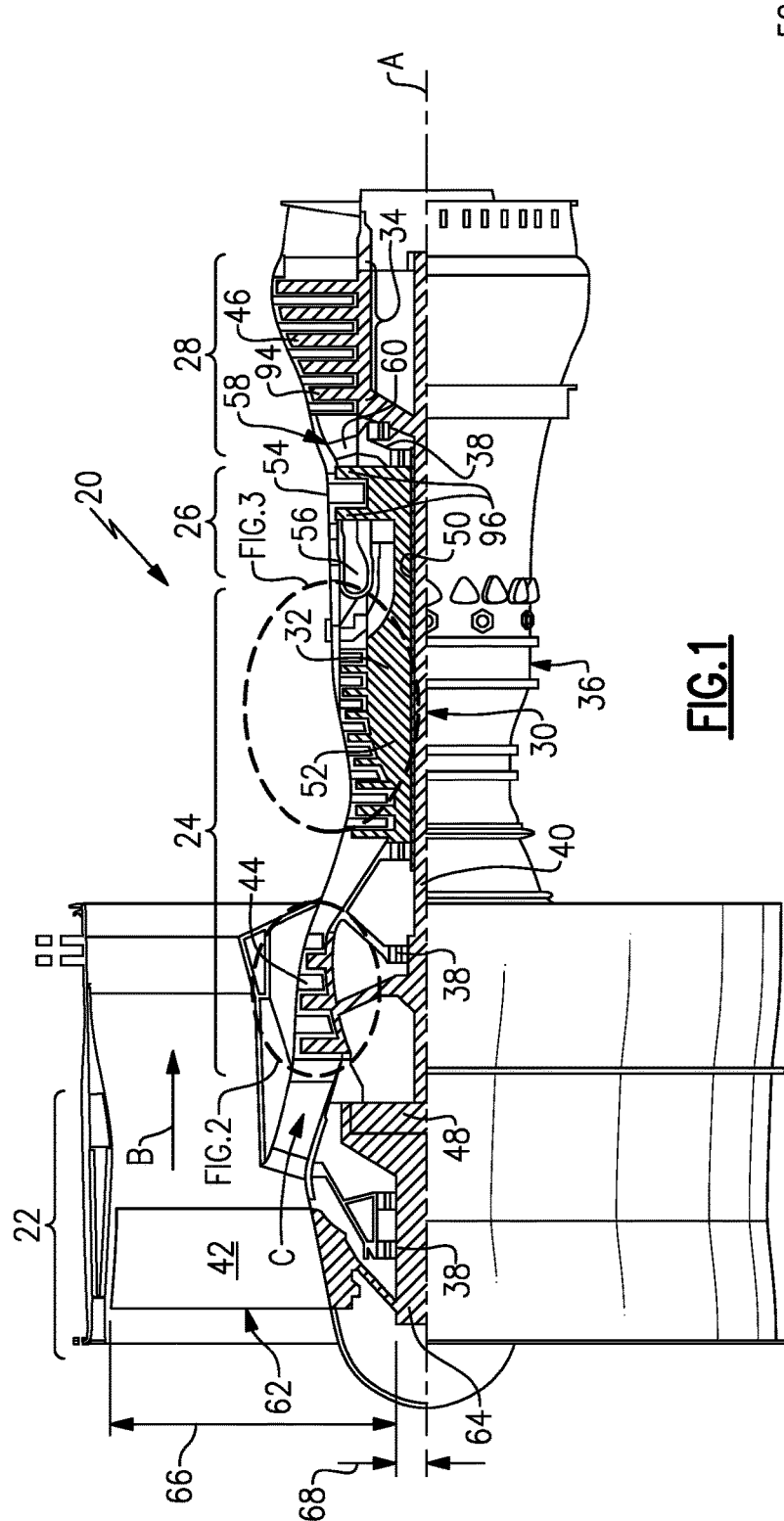
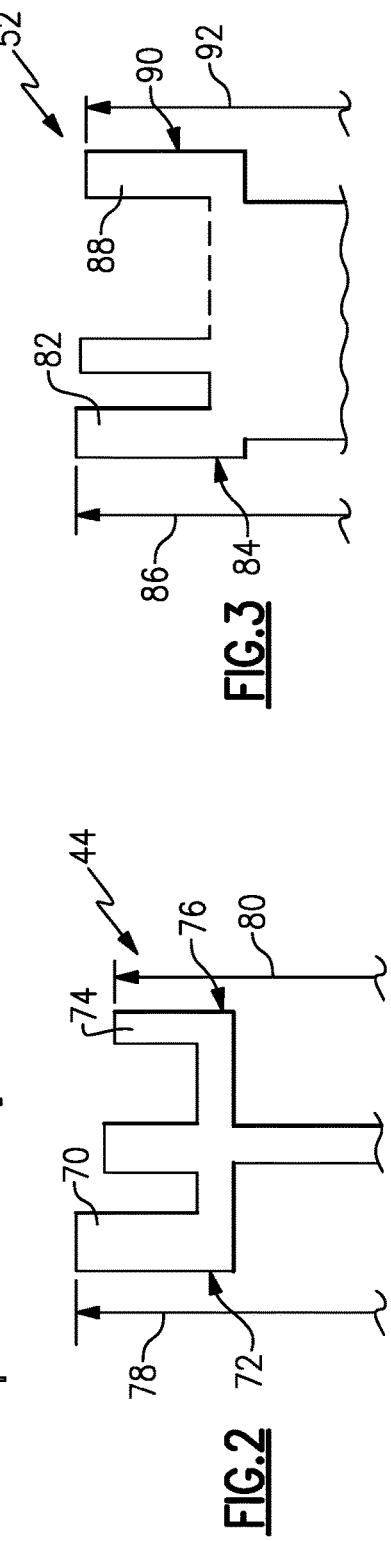
FIG.1
FIG.3
FIG.2

GEARED TURBOFAN ENGINE WITH TARGETED MODULAR EFFICIENCY

CROSS-REFERENCE TO RELATED APPLICATION

This application is a continuation of U.S. patent application Ser. No. 17/038,608 filed on Sep. 30, 2020, which is a continuation of U.S. patent application Ser. No. 16/531,704 filed on Aug. 5, 2019, now U.S. Pat. No. 10,823,052 granted on Nov. 3, 2020, which is a continuation of U.S. patent application Ser. No. 14/651,923 filed on Jun. 12, 2015, now U.S. Pat. No. 10,371,047 granted on Aug. 6, 2019, which is a National Phase application of International Application No. PCT/US2014/057127 filed on Sep. 24, 2014, which claims priority to U.S. Provisional Application No. 61/891,475 filed on Oct. 16, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine by allowing an increase in the fan diameter and a reduction in a fan pressure rise. In such engine architectures, a shaft driven by one of the turbine sections provides an input to the epicyclical gear assembly that drives the fan section at a reduced speed such that both the turbine section and the fan section can rotate at closer to their individual optimal speeds.

Although geared architectures have improved propulsive efficiency, turbine engine manufacturers continue to seek further improvements to engine performance including improvements to thermal, transfer and propulsive efficiencies.

SUMMARY

A turbine engine according to an exemplary embodiment of this disclosure, among other possible things includes a fan section including a fan blade having a leading edge and hub to tip ratio of less than about 0.34 and greater than about 0.020 measured at the leading edge and a speed change mechanism with gear ratio greater than about 2.6 to 1. A first compression section includes a last blade trailing edge radial tip length that is greater than about 67% of the radial tip length of a leading edge of a first stage of the first compression section. A second compression section includes a last blade trailing edge radial tip length that is greater than about 57% of a radial tip length of a leading edge of a first stage of the first compression section.

In a further embodiment of the foregoing turbine engine, the fan section provides a low fan pressure ratio less than about 1.6.

In a further embodiment of any of the foregoing turbine engines, the fan section provides a low fan pressure ratio between about 1.45 and about 1.20.

In a further embodiment of any of the foregoing turbine engines, the fan section provides a bypass ratio greater than about 8.

In a further embodiment of any of the foregoing turbine engines, the fan section provides a bypass ratio greater than about 8.

In a further embodiment of any of the foregoing turbine engines, the fan section provides a bypass ratio greater than about 12.

In a further embodiment of any of the foregoing turbine engines, includes a turbine section that has a fan drive turbine and at least two turbine stages forward of a first turbine blade of the fan drive turbine.

In a further embodiment of any of the foregoing turbine engines, the fan drive turbine includes at least three stages.

In a further embodiment of any of the foregoing turbine engines, the fan drive turbine is coupled to the drive the first compression section.

In a further embodiment of any of the foregoing turbine engines, at least one of the at least two turbine stages is coupled to drive the second compression section.

In a further embodiment of any of the foregoing turbine engines, the at least two stages include a single turbine second forward of the fan drive turbine.

In a further embodiment of any of the foregoing turbine engines, the first compression section includes three stages and the second compression section includes eight stages.

A turbine engine according to an exemplary embodiment of this disclosure, among other possible things includes a fan section providing a bypass ratio greater than about 12, and a speed change mechanism with gear ratio greater than about 2.6 to 1. A first compression section includes a last blade trailing edge tip length that is greater than 67% of the radial length of a first stage leading edge of the first compression section. A second compression section includes a last blade with a trailing edge tip that includes a radial length that is greater than 57% of a radial length of the first stage leading edge of the first compression section.

In a further embodiment of any of the foregoing turbine engines, the fan section includes a plurality of fan blades supported on a hub. A leading edge of at least one of the fan blades includes a leading edge and a hub to tip ratio is less than about 0.34 and greater than about 0.020 measured at the leading edge.

In a further embodiment of any of the foregoing turbine engines, includes a turbine section that has a fan drive turbine and at least two turbine stages forward of a first turbine blade of the fan drive turbine.

In a further embodiment of any of the foregoing turbine engines, at least one of the at least two turbine stages is coupled to drive the second compression section.

In a further embodiment of any of the foregoing turbine engines, the at least two stages include a single turbine section forward of the fan drive turbine.

In a further embodiment of any of the foregoing turbine engines, the fan section provides a fan pressure ratio between about 1.45 and about 1.20.

In a further embodiment of any of the foregoing turbine engines, the first compression section includes three stages and the second compression section includes eight stages.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic view of an example turbine engine according to an embodiment.

FIG. 2 is a schematic view of a compressor section of the example turbine engine according to an embodiment.

FIG. 3 is a schematic view of another compressor section of the example turbine engine according to an embodiment.

DETAILED DESCRIPTION

FIG. 1 schematically illustrates an example gas turbine engine 20 that includes a fan section 22, a compressor section 24, a combustor section 26 and a turbine section 28. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts one gas turbine engine, it should be understood that the concepts and teachings described herein may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects the fan section 22 and a low pressure (or first) compressor section 44 to a low pressure (or first) turbine section 46. The inner shaft 40 drives the fan section 22 through a speed change device, such as a geared architecture 48, to drive the fan section 22 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle. The low pressure turbine 46 is coupled to the fan section 22 through the geared architecture 48 and therefore is also referred to interchangeably in this disclosure as the fan drive turbine 46.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the fan drive turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and fan drive turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Choosing a high gearbox input to output ratio, reduces the number of vane rows in the fan drive turbine 46 and shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about eight (8), with an example embodiment being greater than about twelve (12). The geared architecture 48 is an epicyclical gear train, such as a planetary gear system, star gear system or other known gear system, with a gear reduction ratio of greater than about 2.6.

In one disclosed embodiment, the gas turbine engine 20 includes a bypass ratio greater than about twelve (12:1) and a diameter of the fan blades 42 is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by flow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is between 1.45 and 1.20.

"Low corrected fan tip speed" is the actual fan tip speed in ft/sec divided by an industry standard temperature correction of $[(\text{Tram }° R)/(518.7° R)]^{0.5}$. The "Low corrected fan tip speed", as disclosed herein according to one non-limiting embodiment, is less than about 1150 ft/second.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotor stages schematically indicated at 34. In another non-limiting example embodiment, the low pressure turbine 46 includes about 3 turbine rotor states. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotor stages 34 in the low pressure turbine 46 and the number of blades 42 in the fan section 22 disclose an example gas turbine engine 20 with increased power transfer efficiency.

An example disclosed engine 20 provides a system-level combination of component (module) efficiencies and a system-level combination of features within these modules that are used to arrive at uniquely high engine efficiency (i.e. Thrust Specific Fuel Consumption) at takeoff and at bucket cruise. The disclosed combination of components provide benefit in a commercial engine with very high bypass ratio in achieving the stated, very low, thrust specific fuel consumption (see table 1) and is especially beneficial to a single aisle aircraft where the overall pressure ratio of the compressor is less than 50.

maintaining this dimension within the desired ratio range enables a reduction in engine weight relative to an engine with a higher hub to tip ratio. In one example embodiment, the fan section 22 further provides a low fan pressure ratio that is between about 1.45 and about 1.20, and a bypass ratio greater than about 8.0.

The disclosed engine 20 includes the geared architecture 48 with a gear ratio greater than about 2.6 to 1. In this example, the speed change system is the geared architecture, which is an epicyclical gearbox and which includes planet gears or star gears interspersed by baffles for gathering and directing lubricant during operation.

The example turbine section 28 has at least two turbine stages forward of the first turbine stage 94 included in the fan drive turbine 46. In this example, the high pressure or second turbine includes two turbine stages 96 forward of the fan drive turbine 46. In this example, the two turbine stages 96 are part of a single high pressure turbine 54 with at least two turbine rotors 96, however, it is within the contemplation of this disclosure that the at least two turbine rotors forward of the fan drive turbine 46 could be part of multiple turbines that rotate independent of each other, for example, two separate turbine sections with at least one turbine rotor each.

Referring to FIG. 2, with continued reference to FIG. 1, the first compression section 44, which in one disclosed example is a low pressure compressor (LPC) 44, includes three stages. The example LPC 44 includes first compressor blade 70 with a leading edge 72 and a last compressor blade 74 with trailing edge 76. A tip of the leading edge 72 of the first blade 70 extends a radial distance 78 from the engine axis A. A tip of the trailing edge 76 of the last blade 74 extends a radial distance 80 from the engine axis A. The first compression section 44 is configured such that a ratio between the radial distance 80 at the trailing edge 76 is

TABLE 1

|  | Sea level takeoff, 86 deg F, 0.0 Mn: Test Stand Operation: no power extraction, no Environmental Control System bleed | [2]Sea level takeoff, 86 deg F, 0.0 Mn: Test Stand Operation: no power extraction, no Environmental Control System bleed | Bucket Cruise, 0.8 Mn, 35,000 ft, Standard Day |
|---|---|---|---|
| Thrust Specific Fuel Consumption [1] |  | 0.2751 | 0.53717 |
| Speed change (Input/output) | At least | 2.6 | 2.6 |
| Component efficiency |  |  |  |
| Fan OD | at least 0.90 | 0.9344 | 0.96501 |
| Speed Change Mechanism | at least 0.985 | 0.9949 | 0.99374 |
| First Compressor or LPC | at least 0.84 | 0.8695 | 0.86622 |
| Second Compressor or HPC | at least 0.82 | 0.8495 | 0.8356 |
| Turbine Section(s) excluding the fan drive turbine | at least 0.85 for the single HPT or combined efficiency if two or more turbines are used | 0.87544 | 0.8938 |
| Fan Drive turbine | at least 0.89 | 0.9251 | 0.9266 |

The combination of module efficiency includes among other possible things, the fan section 22 with the fan blades 42 supported on a fan hub 64. Each of the fan blades 42 includes a leading edge 62 that extends a radial distance 66 from the engine axis A. The fan hub 64 extends a radial distance 68 from the engine axis A. A low hub-tip ratio of fan hub radial radius 68 to the radius at the leading edge 62 of the fan blade 42 is less than 0.34 and greater than 0.020. The disclosed range of ratios is desirable in that the lower this value is, the smaller the outer fan section and inlet section has to be to accommodate a given amount of air, and greater than 67% of the radial distance 78 of the leading edge 72 of the first blade 70. The example configuration provided by the disclosed ratio enables improved airflow through the first compressor section 44 that provides improved efficiency. The disclosed relationship between the leading edge 72 and the trailing edge 76 enables a beneficial modest slope to the engine casing structures spanning the compressor section 24. The modest slope provides for minimal effects to tip clearances of the compressor blades due to axial shifting of the compressor rotor due to overall aerodynamic loading.

Referring to FIG. 3 with continued reference to FIG. 1, the second compression section 52, which in one disclosed example is a high pressure compressor (HPC), includes at least eight stages. The example HPC 52 includes a first blade 82 with a leading edge 84 that extends a radial distance 86 from the engine axis A to a tip. The second compressor section 52 also includes a last blade 88 having a trailing edge 90 that extends a radial distance 92 from the engine axis A to the tip. A ratio between the leading edge 84 and the trailing edge 90 defines the configuration of the compressor 52 that provides the improved efficiency. In one disclosed example, the radial distance 92 of the trailing edge 90 of the last blade 88 is greater than about 57% of the radial distance 86 of the leading edge 84 of the first blade 82 of the second compressor section 52.

A geared turbine arrangement for short range aircraft can uniquely exploit the particular aspects of an aircraft duty cycle that is characterized by an unusually low proportion of time in cruise operation versus the total time spent at takeoff and climb power (for a representative time span such as between engine overhauls).

A definition of a short range aircraft is one with a total flight length less than about 300 nautical miles.

TABLE 2

| Engine | #1 | #2 |
| --- | --- | --- |
| Max takeoff weight | 53,060 kg (117,000 lb) | 58,967 kg (130,000 lb) |
| Max landing weight | 49,895 kg (110,000 lb) | 55,111 kg (121,500 lb) |
| Maximum cargo payload | 3,629 kg (8,000 lb) | 4,853 kg (10,700 lb) |
| Maximum payload (total) | 13,676 kg (30,150 lb) | 16,284 kg (35,900 lb) |
| Max range | 2,778 km (1,500 nmi) | 2,778 km (1,500 nmi) |
| Take off run at MTOW | 1,219 m (3,999 ft) | 1,524 m (5,000 ft) |
| Landing field length at MLW | 1,341 m (4,400 ft) | 1,448 m (4,751 ft) |

As is shown in Table 2, a short range aircraft for purposes of this disclosure is defined as including a single aisle configuration with 2, 3 seating or 3, 3 seating. Conventionally, a short range aircraft have a capacity of about 200 passengers or less. Moreover, an example short range aircraft will have a maximum range of only about 1500 nautical miles.

Because of the extremely high utilization in terms of cumulative hours at relatively high power during take-off conditions, the disclosed geared turbine engine 20 arrangement is configured differently to achieve a beneficial balance of fuel burn and maintenance costs. The high power utilization is a result of frequent operation at high power conditions that generate high turbine temperatures, elevated turbine cooling air temperatures and elevated temperatures at the rear stage of the compressor. The result of such operation is that LPC pressures rise, temperature rise and efficiency may be lower than for a long range aircraft. In a long range aircraft that operates for longer periods and a greater portion of the cumulative operating hours, maximizing LPC efficiency is desired provides a significant benefit, and is a key difference when compared to short range aircraft. Pressure and temperature rise can be increased due to the less frequent use of takeoff power between overhaul periods which could be around 4000 hours for both the short range and long range commercial airliner.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine comprising;
a fan section;
a first compression section includes a last blade trailing edge radial tip length that is greater than 67% of a radial tip length of a leading edge of a first stage of the first compression section;
a second compression section including a last blade trailing edge radial tip length that is greater than 57% of the radial tip length of the leading edge of the first stage of the second compression section;
a turbine section including a fan drive turbine section and at least two turbine stages forward of a first turbine blade of the fan drive turbine section; and
a mid-turbine frame disposed between the fan drive turbine and the at least two turbine stages.

2. The turbine engine as recited in claim 1, wherein the fan section includes a fan blade having a leading edge and a hub to tip ratio of less than 0.34 and greater than 0.020 measured at the leading edge.

3. The turbine engine as recited in claim 2, including a speed change system coupled between the fan drive turbine and the fan section, the speed change system including a gear ratio greater than 2.6 to 1.

4. The turbine engine as recited in claim 3, wherein the fan section provides a low fan pressure ratio less than 1.6.

5. The turbine engine as recited in claim 3, wherein the fan section provides a low fan pressure ratio between 1.45 and 1.20.

6. The turbine engine as recited in claim 3, wherein the fan section provides a bypass ratio greater than 8.

7. The turbine engine as recited in claim 3, wherein the fan section provides a bypass ratio greater than 12.

8. The turbine engine as recited in claim 3, wherein the fan drive turbine includes at least three stages.

9. The turbine engine as recited in claim 1, wherein the fan drive turbine is coupled to drive the first compression section.

10. The turbine engine as recited in claim 9, wherein the at least two stages comprise a two stage turbine forward of the fan drive turbine.

11. The turbine engine as recited in claim 9, wherein the fan drive turbine comprises a turbine with from three to six stages.

12. A turbine engine comprising:
a fan section including a plurality of fan blades supported on a hub;
a speed change system coupled to the hub with a gear ratio greater than about 2.6 to 1;
a first compression section including a last blade trailing edge tip length that is greater than 67% of the radial length of a first stage leading edge of the first compression section;

a turbine section including a fan drive turbine section coupled to the speed change system and at least two turbine stages forward of a first turbine blade of the fan drive turbine section; and a mid-turbine frame disposed between the fan drive turbine and the at least two turbine stages for guiding core flow into the fan drive turbine, the mid-turbine frame supporting a bearing system for one of the fan drive turbine and the at least two turbine stages.

13. The turbine engine as recited in claim 12, wherein at least one of the plurality of fan blades includes a leading edge and a hub to tip ratio is less than about 0.34 and greater than about 0.020 measured at the leading edge.

14. A turbine engine as recited in claim 12, including an eight stage second compression section including a last blade with a trailing edge tip that includes a radial length that is greater than 57% of a radial length of the first stage leading edge of the second compression section.

15. The turbine engine as recited in claim 14, wherein the second compression section operates at an efficiency of at least 0.82.

16. The turbine engine as recited in claim 12, wherein the at least two stages comprise a two-stage second turbine section forward of the fan drive turbine.

17. The turbine engine as recited in claim 12, wherein the fan drive turbine operates at an efficiency of at least 0.89 and the at least two turbine stages forward of the fan drive turbine section comprises a second turbine section operating at an efficiency of at least 0.85.

18. A turbine engine comprising:
a fan section including a plurality of fan blades supported on a hub;
a three-stage first compression section disposed aft of a geared architecture, the three-stage first compression section including a first rotating compressor blade with a leading edge and a last rotating compressor blade with a trailing edge, wherein a radial distance from an engine longitudinal axis to a tip of the trailing edge of the last rotating compressor blade is greater than 67% of a radial distance from the engine longitudinal axis to a tip of the first rotating compressor blade at the leading edge;
an eight stage second compression section including a last rotating compressor blade with a trailing edge tip that includes a radial length that is greater than 57% of a radial length of the first rotating compressor blade at the leading edge of the eight-stage first compression section;
a turbine section including a fan drive turbine section and a two stage turbine section forward of a first turbine blade of the fan drive turbine section, wherein the fan drive turbine operates at an efficiency of at least 0.89; and
the geared architecture coupled between the fan drive turbine and the hub of the fan section, the geared architecture including with a gear ratio greater than about 2.6 to 1.

19. The turbine engine as recited in claim 18, wherein at least one of the plurality of fan blades includes a leading edge and a hub to tip ratio is less than about 0.34 and greater than about 0.020 measured at the leading edge.

20. The turbine engine as recited in claim 18, including a mid-turbine frame disposed between the fan drive turbine and the two stage turbine section for guiding core flow into the fan drive turbine, the mid-turbine frame supporting a bearing system for one of the fan drive turbine and the two stage turbine section.

* * * * *